United States Patent Office 3,276,848
Patented Oct. 4, 1966

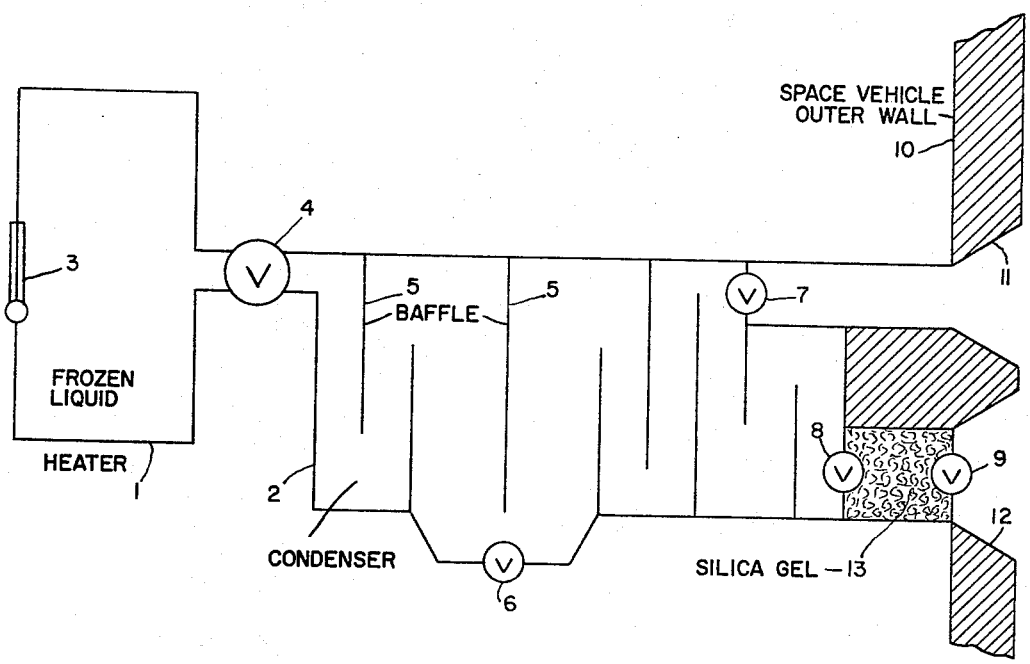

3,276,848
PROCESS OF RECOVERING POTABLE WATER FROM BODY WASTES
Courtland H. Barr, Sr., Los Angeles, Courtland H. Barr, Jr., La Canada, and John W. Barr, Glendale, Calif., assignors to Courtland Laboratories, Los Angeles, Calif., a corporation of California
Filed June 19, 1962, Ser. No. 203,641
3 Claims. (Cl. 23—294)

This invention relates to a method and apparatus for the recovery of water, which method and apparatus are particularly suited for use in outer space.

As man's exploration of outer space continues, it will be necessary that space vehicles and stationary space stations be capable of remaining aloft for extended periods of time. However, as in aircraft of all types, weight will be a critical factor in the construction of space ships. This is true even though the lack of gravitational forces in outer space render objects substantially weightless, because the weight of an object to be propelled into outer space will determine the magnitude of propulsive force which must be delivered by the propelling means. Therefore, it is obviously desirable to hold the weight of space ships at a minimum.

In space ships which are to remain aloft for extended periods of time, a major factor in the weight of the ship will be the necessities of human existence. Included in these necessities are, of course, food and drink. Many substantial advances have been made in reducing the weight of foodstuffs by means of dehydration and synthesis of vitamins, proteins and the like. However, no means has yet been devised to reduce the weight of the water which is necessary to sustain human life. Furthermore, many of the dehydrated foodstuffs require the addition of water before they are edible.

It is an object of the present invention to provide a method and apparatus which will eliminate the need for storage of massive quantities of water in space ships which are to remain aloft for extended periods of time.

It is another object of the present invention to provide a method and apparatus for recovery of potable water from body wastes.

It is another object of the present invention to provide a method and apparatus for the recovery of potable water from body wastes by means of freeze drying. It is a still further object of the present invention to provide a method and apparatus for the recovery of potable water from body wastes by freeze drying in which the low temperature and substantial vacuum which exists in outer space are used.

Briefly, the present invention comprises a method and apparatus wherein body wastes are subjected to a freeze drying treatment. In order to accomplish this freeze drying, the extremely low temperatures and the substantial vacuum existing in outer space are utilized by providing means in a space vehicle which will expose the body wastes to the environmental conditions which prevail in outer space. The freeze drying is performed such that the body wastes are first degassed, the moisture content then removed by sublimation, and the residue, if any, is then discarded. The sublimated moisture may be collected by condensation or by adsorption, or both. It is also contemplated by the present invention to provide a method and apparatus for the recovery of potable water from body wastes by using the environmental conditions prevailing in outer space as a medium for vacuum distillation of the body wastes. The small amount of heat required for such distillation may be obtained by employing solar heat or by conducting heat from the interior or propulsion means of the space vehicle.

For the purposes of description, reference is had to the drawing, but it is to be understood that the invention is not to be limited to the specific details thereof.

In the drawing, a preferred embodiment of the apparatus of the present invention is illustrated. The apparatus comprises a cabinet 1 and a condenser indicated generally by numeral 2. Cabinet 1 is provided with door 3. A valve 4 is located in the line which connects the cabinet 1 and the condenser 2. Condenser 2 is provided with a series of baffles 5. Condenser 2 is also provided with valves 6, 7, 8 and 9. The end of the condenser remote from cabinet 1 is adjacent outer wall 10 of a space vehicle (not shown). The condenser is also provided with flared outlets 11 and 12 which are also apertures in wall 10. A bed of silica gel is positioned between valves 8 and 9.

In operation, open containers of body waste, e.g., urine, are placed in cabinet 1 through door 3. Door 3, which is preferably hermetically sealed, is then closed. While the cabinet is being loaded valves 4, 6, 7, 8 and 9 are closed.

After door 3 has been closed, valves 4 and 7 are opened. When the space vehicle is in outer space, this will cause an evacuation of cabinet 1. This evacuation immediately causes a degassing to commence. During this degassing, ammonia and other organic fumes are exhausted into space through outlet 11. When the body waste has been substantially degassed, the liquid remaining in the containers in cabinet 1 freezes. At this point, a gentle warming may be applied. Any source of heat may be used, e.g., solar heat, or heat conducted from the interior or propulsive means of the space vehicle. Before this heating is performed, valve 7 is closed and valves 8 and 9 are opened. This heating causes sublimation of the water vapors contained in the frozen liquid. After the sublimed vapors pass through valve 4 they are condensed into frozen solids on baffles 5 of condenser 2.

In the preferred embodiment of this invention illustrated in the drawing, silica gel bed 13 is also provided to adsorb excess vapors which are not condensed on baffles 5. The apparatus is then allowed to function in this manner until the desired amount, or substantially all, of the water has been removed from the body waste in cabinet 1. Valves 4, 7 and 9 are then closed, and valve 6 is opened. The recovered potable water is then removed from condenser 2 through valve 6. This removal may be promoted by heating condenser 2. The frozen water on baffles 5 as well as the adsorbed water vapors held by silica gel 13 are thus completely recovered.

It is highly desirable to maintain the condenser surfaces 5 at as low a temperature as is possible, in order to assure the recovery of a maximum amount of water. Therefore, it is preferred to provide condenser 2 with effective insulation. Furthermore, the vacuum exerted on the system may be increased somewhat by locating the outlets 11 and 12 such that they open in a direction opposite to that in which the space vehicle is moving. This causes a certain amount of induced evacuation of the system. However, as the atmosphere "thins," i.e., as the atmosphere more closely approaches a vacuum, less induction takes place.

The present invention also contemplates the use of vacuum distillation to recover potable water from body wastes. In this embodiment, the distillation vessel is exposed to the atmosphere, i.e., to a substantial vacuum, in much the same manner as cabinet 1. Radiant or other heat is then applied to the distillation vessel to cause sufficient vapor pressure to result in boiling. The water vapor fraction of the distilled vapors are then collected in any conventional manner.

It will be obvious to one skilled in the art that many modifications of the present invention may be made without departing from the scope thereof. For example, the baffles 5 of the condenser may be replaced by coils or other suitable condenser surfaces. Furthermore, the apparatus of the present invention may obviously be employed to freeze dry and/or dehydrate substances other than body wastes. Still further, any water adsorbent material may be used in place of silica gel.

The weight of the apparatus of the present invention is nominal as compared with the weight of water which would otherwise have to be stored on a space vehicle which was to make an extended voyage. This saving in weight permits the storage of other equipment or materials or, in the alternative, permits a reduction in the magnitude of the propulsive force required to propel the vehicle into space.

Having fully described the present invention, it is to be understood that we do not wish to be limited to the details set forth, but our invention is of the full scope of the appended claims.

We claim:

1. A process for recovering potable water from body wastes comprising urine in outer space which comprises exposing the urine to the pressure and temperature conditions prevailing in outer space whereby the urine is degassed and frozen; heating said frozen urine sufficiently to sublime the water vapor therein but insufficiently to melt said frozen urine; condensing said vapor; and collecting said condensed vapor to recover potable water.

2. The process of claim 1 wherein that portion of said vapor which is not condensed is passed through a water adsorbent.

3. The process of claim 1 wherein said condensing comprises freezing.

References Cited by the Examiner

UNITED STATES PATENTS

| | | | |
|---|---|---|---|
| 828,887 | 8/1906 | Hoofnagle | 55—55 |
| 1,544,029 | 6/1925 | Nelson. | |
| 2,045,607 | 6/1936 | Miller | 202—67 |
| 2,424,142 | 7/1947 | Bimpson et al. | |
| 2,479,766 | 8/1949 | Mulvany | 203—10 |
| 2,629,687 | 2/1953 | Silva. | |
| 2,636,129 | 4/1953 | Agnew. | |
| 2,853,797 | 9/1958 | Graham et al. | 34—5 |
| 2,993,764 | 7/1961 | Grulet et al. | 23—294 |
| 3,077,036 | 2/1963 | Neumann | 34—5 |

NORMAN YUDKOFF, *Primary Examiner.*

F. E. DRUMMOND, M. H. SILVERSTEIN, *Examiners.*